3,500,403
SHORT RANGE RADAR SYSTEM
Keith Lewis Fuller, Reigate, Surrey, England, assignor, by mesne assignments, to U.S. Philips Corporation, New York, N.Y., a corporation of Delaware
Filed Oct. 26, 1967, Ser. No. 678,264
Claims priority, application Great Britain, Oct. 26, 1966, 47,976/66
Int. Cl. G01s 9/23, 9/24
U.S. Cl. 343—14                 8 Claims

ABSTRACT OF THE DISCLOSURE

A radar system transmits a frequency modulated beam with an antenna having a frequency-dependent directional characteristic, so that the beam continuously scans a given sector. The receiver has a local oscillator that has a sweep rate much slower than the sweep rate of the transmitted beam, and the local oscillations are mixed with the received echo signals to produce a constant frequency I.F. signal.

---

The invention relates to a radar system for very short distances having a high resolving power, suitable for scanning a sector.

Such a system may be mounted, for example, on a vehicle which has to travel rapidly in thick fog, for example, on vehicles serving as pilot cars or fire-brigade vans on airfields.

In this radar system a transmitter transmits continuously a signal which is linearly and periodically frequency-modulated under the control of a first sawtooth generator, whilst the incoming echo signal is mixed with the transmitted signal for obtaining a beat frequency and the receiver comprises a filter for separating out a predetermined beat frequency.

Such a radar system is known inter alia from British patent specification 581,169. In this known system scanning is performed so that a so-called E-scope is obtained. For scanning a sector by means of this method a mechanically rotating aerial is employed so that signals proportional to the position of the aerial in conjunction with the E-scopes provide a sector image. Owing to the mechanical rotation of the aerial these systems are slow and require an accurate angle-transfer system for the aerial position to the display unit.

The invention obviates this disadvantage since the system comprises an aerial having a frequency-dependent directional characteristic and means shifting periodically the pass frequency of the filter linearly with time under the control of a second sawtooth generator, whilst the variation of the pass frequency of the filter per unit time is considerably smaller than that of the transmitted signal and the duration of the period of the second sawtooth generator is considerably longer than that of the first sawtooth generator.

The invention is therefore based on the use of aerials having a linearly frequency-dependent directional characteristic and emitting a narrow beam, for example, a wave pipe having a corrugated slot in the longitudinal direction or a wave pipe having a plurality of transverse slots approximately at a relative distance of one half wavelength in the wave pipe with a frequency midway the band concerned or two or more horn radiators are employed, which are fed through different frequency-dependent elements and so on.

The invention will be described with reference to the drawing.

FIG. 1 illustrates the frequency variation of the transmitted signal plotted against time; this is indicated by the full line.

Figure 1:
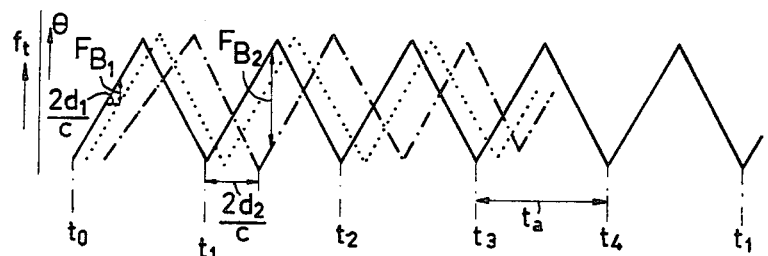
FIGS. 1 to 5 illustrate in detail the principle of the scanning method.

As is shown in the drawing, this curve has a portion increasing linearly in frequency and a portion decreasing linearly in frequency, so that with respect to time a triangular signal frequency is obtained, which has a time period $t_a$.

In principle it is possible to cause the signal frequency to increase continuously, but practice restricts the use to periodical signals of sawtooth waveform. By the full line in FIG. 1 is also indicated the angle $\theta$ as a function of time, wherein $\theta$ designates the angle of transmission of the high-frequency energy by the aerial at a given instant with respect to a zero direction.

From this figure is furthermore apparent the required linear directional dependence of the aerial as function of frequency.

From a target at a distance $d_1$ from the transmitter aerial an echo signal is received in the receiver after a period of time of $2d_1/c$, wherein $c$ designates the speed of light, subsequent to the emission of a signal. This echo signal is indicated in FIG. 1 by the broken line. For a target at a distance $d_2$ the echotime is $2d_2/c$, indicated in FIG. 1 by the dot-and-dash line.

By mixing the echo signals with the instantaneous transmitted frequencies, beat frequencies are obtained, which are a measure for the distances of the targets producing the echos. For the targets $d_1$ and $d_2$ they are $F_{B1}$ and $F_{B2}$ respectively (see FIG. 1).

Figure 2:
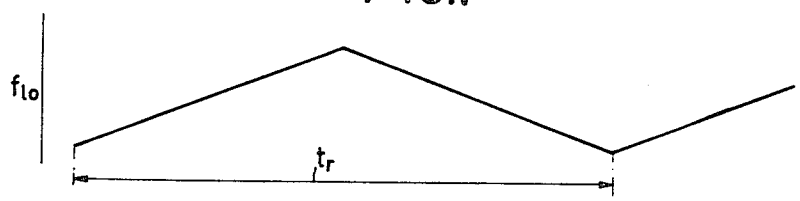

These beat frequencies may be separated by using a sequence of band pass filters having relatively off-set pass frequencies. It is preferred, however, to use an auxiliary oscillator as is explained more fully with reference to FIGS. 2 and 3. The signal produced by the auxiliary oscillator is indicated in FIG. 2 in the form of the signal frequency with respect to time. Also in this case a triangular frequency-modulated signal is given as an example, the duration of the period being, however, $t_r$.

Figure 3:
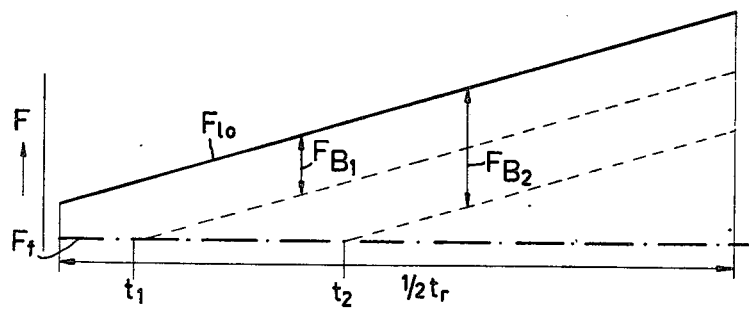

It is shown in FIG. 3 that the signals of the given beat frequencies are mixed with the signal of the auxiliary oscillator. The full line in FIG. 3 represents the frequency-modulated signal $F_{10}$ of the auxiliary oscillator. This signal is reduced in frequency by the frequencies $F_{B1}$ and $F_{B2}$ of the beat signals. The frequency $F_f$ passed by the filter is indicated by a dot-and-dash line.

From FIG. 3 it will be apparent that signals from targets at different distances from the transmitter-receiver are passed in order of succession in time as a function of said distances by the fixed filter, so that a simple distance measurement is obtained. The absolute magnitude of the frequency sweep of the auxiliary oscillator is determined by the maximum distance for which the radar system is designed and the frequency variation of the transmitted signal per unit time. In order to distinguish targets located at a very short distance one behind the other, the frequency variation per unit time of the transmitted signal has to be as great as possible, whereas the frequency variation per unit time of the auxiliary oscillator has to be small in order to provide sufficient time for the filter to swing in.

For a rapid frequency variation per unit time of the transmitted signal the absolute frequency sweep of the transmitted signal has to be very great. This absolute frequency sweep depends, however, on the absolute angle variation of the directional beam of the aerial as a function of said frequency. Since, however, the high-frequency energy propagates with the speed of light, only a very short period of time after the emission is available for scanning the distance. In order to allow an adequately slow scan the transmitted pattern is repeated several times so that the period $t_r$ of the signal of the auxiliary oscillator is considerably longer than the period $t_a$ of the transmitted signal.

Figure 4:
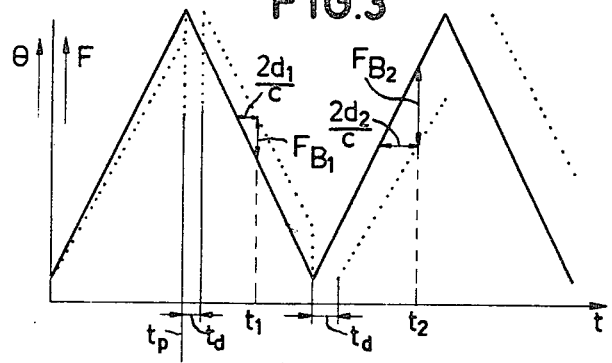

FIG. 4 illustrates the frequencies of the transmitted signal by the full line which also indicates the angle of transmission and the frequencies of the echo signal for which the receiver is instantaneously sensitive by a broken line plotted against time. Since the echo time corresponds to the distance of the reflecting target from the transmitter-receiver, the distance for which the receiver is sensitive increases linearly, as is shown in FIG. 4. For a target at a distance $d_1$, the beat frequency being $F_{b1}$, the receiver is selective at the instant $t_1$ and for a target at a distance $d_2$ at the instant $t_2$. The linearity with increasing distances is interrupted at the instant $t_p$ for a time $t_d$. Since, however, the absolute frequency variation of the auxiliary oscillator is very small as compared with that of the transmitted signal, the two lines substantially coincide so that the times $t_d$ become very short. This means, in addition, that the direction in which an echo is received does not differ considerably from the distance in which a signal is transmitted at the same instant, so that the difference in ordinates in FIG. 4 is a measure of the distance of a target from the transmitter-receiver, whilst the ordinate itself indicates the value of the angle at which the target is located in the scanned plane with respect to a given zero line.

Figure 5:
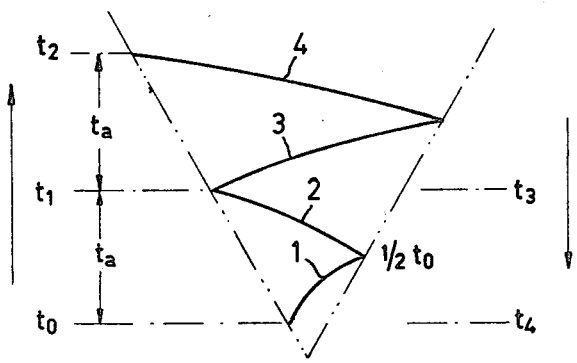

The method of scanning according to the invention is illustrated in FIG. 5. For the sake of simplicity the ratio $t_r/t_a$ is chosen to be 4 instead of the actual value which is equal to or higher than 50.

With a frequency variation of the transmitted signal between the instants $t_0$ and $½t_1$ (see FIG. 1) the angle at which the high-frequency energy is transmitted varies from one extreme value to the other (see FIG. 5), whilst the receiver is sensitive for targets at increasing distances as indicated in FIG. 4 so that only targets located on the line 1 of FIG. 5 can be identified. If the transmitted frequency drops from its maximum to its minimum value during the period $(½)t_1 - t_1$, the directional beam of the aerial returns to its initial value, so that targets located on the line 2 are scanned, since the frequency of the auxiliary oscillator still increases.

For the period of time from $t_1$ to $t_2$ the targets located on the lines 3 and 4 are scanned. From the instant $t_2$ to $t_4$ the frequency of the auxiliary oscillator decreases linearly so that said lines are scanned in the reverse order and so on. The period of the auxiliary oscillator signal is in practice equal to or longer than 50-times the period of the transmitted signal so that a fine scanning raster is obtained. Moreover, if the ratio $t_r/t_a$ is chosen not to be an integral number, an interlinear scanning is obtained. The period of time $t_d$ in which incorrect information is received is extremely short and coincides with the extreme angle values of the sector to be scanned so that this information can be easily suppressed.

Figure 6:
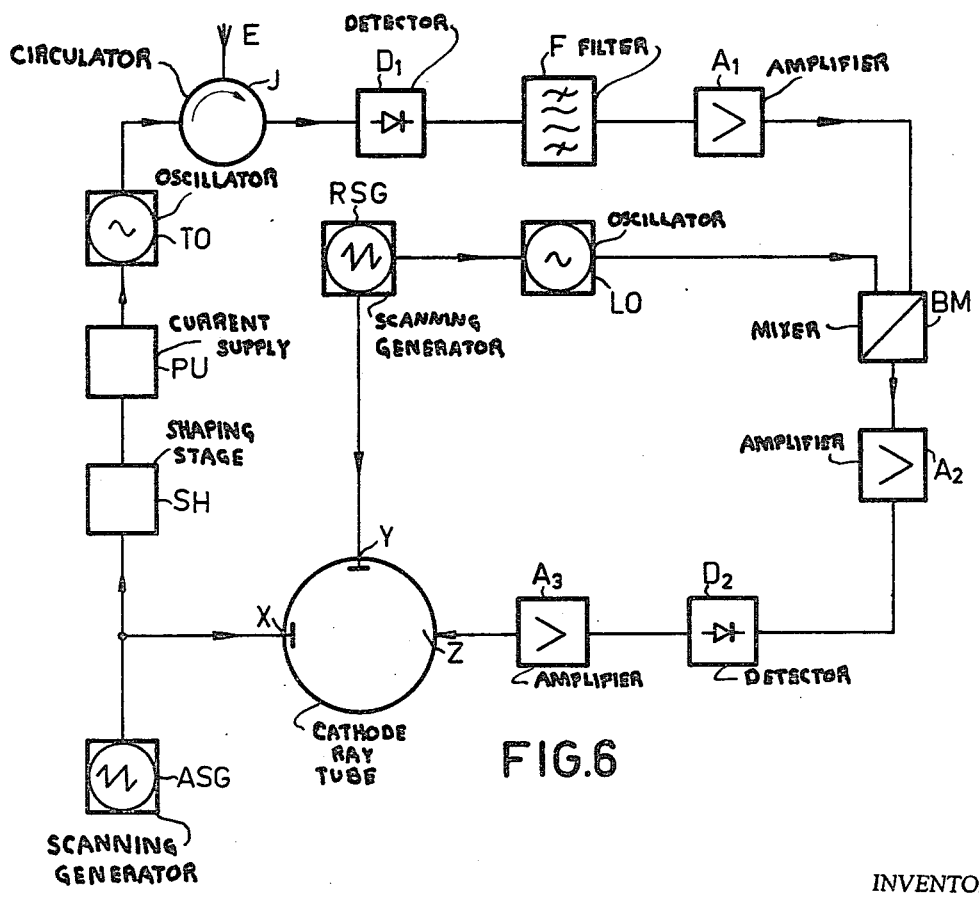

FIG. 6 shows a block diagram of an embodiment of the invention.

The transmitting energy from an oscillator TO is fed through a circulator J to the aerial E, having a frequency-dependent directional characteristic. The oscillator TO may comprise a travelling-wave tube the frequency of which may be varied, for example, from 9.6 to 12.4 gHz. by varying the voltage applied to the tube. The oscillator TO is fed from the current supply apparatus PU, the output voltage of which is controlled by the voltage of the angle-scanning generator ASG, which may produce a sawtooth voltage of a period of 400 μsec. through the stage SH. The circulator J must have a wide band with a minimum of attenuation, lower than 1 db and a high cut-off damping of at least 20 db. Instead of the circulator J a hybrid circuit might be employed, for example a hybrid T with an arm continuously adapted by means of a resistor. The energy leaking through the circulator, together with the energy reflected from a target, is fed to the quadratic detector $D_1$. This detector operates as a mixing stage so that the desired beat signals are obtained.

The resultant signals are applied to a band pass filter F. Beyond its band pass this filter will reflect all energy, for example, the low-frequency flicker noise of the detector and the noise of undesirable output signals, whereas for frequencies located in the pass range the filter is designed so that considerably greater losses are involved with lower frequencies than with higher frequencies in said range. The intention is to level out the amplitude ratios of targets at different distances, since the low-frequency signals originate from targets at short range from the transmitter-receiver, so that they are much stronger than the high-frequency signals since the loss of energy is proportional to the square of the distance. The filter is designed so that the spectrum of the pass range extends from 0.135 to 4.5 mc./s. The signal is applied through an amplifier $A_1$, which should provide adequate amplification for said range, to a push-pull mixing stage BM, to which, in addition, a signal from the auxiliary oscillator LO is applied. The mixing stage BM is formed by a ring modulator owing to the satisfactory broad-band properties and the suppression of the signal from the amplifier $A_1$ and of the signal from the auxiliary oscillator. The auxiliary oscillator provided a linearly frequency-modulated signal lying between 10.835 and 15.2 mc./s. under the control of the range generator RSG, producing a linearly amplitude-modulated signal of triangular waveform having a period of 40 msec.

The resultant mixed signal is applied to the filter $A_2$, which in addition amplifies the signal lying within the pass range of the filter, i.e. 10.7 mc./s. ±50 kc./s. Since the auxiliary oscillator also produces the frequency of 3.57 mc./s. and the third harmonic thereof is 10.7 mc./s., the mixing stage BM has to be constructed so that this third harmonic is suppressed to a negligible level. The information from the preceding amplifier $A_1$ is detected in the detector $D_2$ and amplified by the image intensifier $A_3$ for controlling the brightness of a cathode-ray tube Z by means of cathode-current modulation.

In order to perform a sector scanning of the kind set forth two generators are employed. In order to obtain a flicker-free display on a cathode-ray tube without using long post-luminescence and in order to obtain a fine scanning raster for distinguishing targets the ratio between the periodicity of the range generator RSC and the periodicity of the angle scanning generator ASG is chosen to be 50 to 1.

Figure 7:
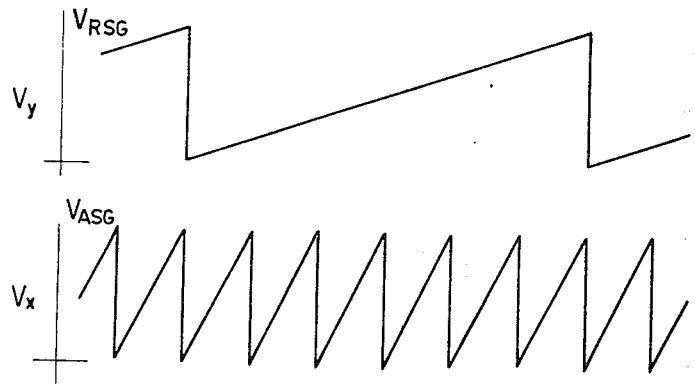
Figure 8:
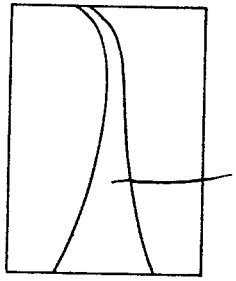
Figure 11:
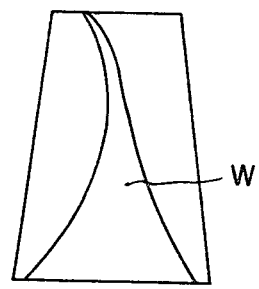
Figure 9:
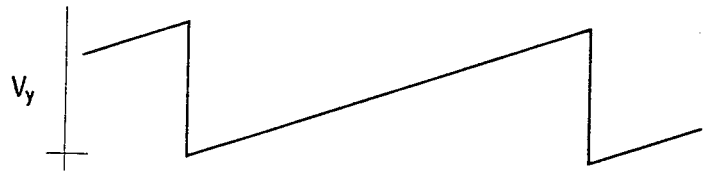
Figure 9:
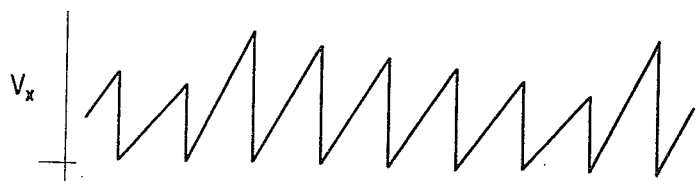

FIG. 7 illustrates the voltages concerned in the form of sawtooth-modulated voltages VRSG and VASG respectively. For the sake of clarity the ratio between the periods of the generator signals is chosen to be 1:6. These signals are applied directly to the vertical and horizontal deflection systems respectively of the cathode-ray tube, as is indicated in the diagram of FIG. 6. The scanned sector is then displayed in the form of a rectangle as shown in FIG. 8. By way of example a road is drawn by its contours W. The road bends to the left on the upper side of the screen. From the figure it is apparent that the perspective of the road is such that near targets of a given size are displayed in a larger form than targets of the same size at a greater distance. This may be advantageous for drivers of vehicles under foggy conditions. This effect may be intensified by applying the voltages of the form shown in FIG. 9 to the deflection system of the cathode-ray tube. In this case the embodiment of FIG. 6 is changed into that of FIG. 10, which only shows the detail of FIG. 6, which is changed. With respect to the vertical deflection there is no difference from FIG. 6, but the circuit for the horizontal deflection includes a modulator stage $M_1$, to which the signals of FIG. 7 are applied. The signal for the horizontal deflection from the angle scanning generator ASG is reduced in amplitude by the signal from the range generator RSG, so that, as is shown in FIG. 9, with an increasing distance a smaller horizontal deflection is obtained, which is shown in FIG. 11, that is to say a greater perspective than in the picture of FIG. 8, so that adjacent targets are still more striking.

Figure 10:
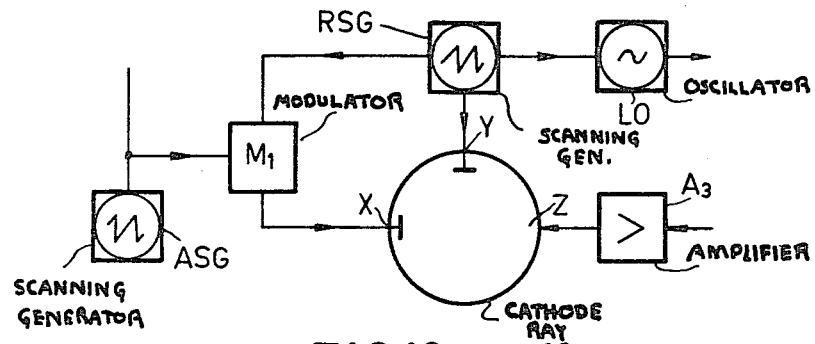
Figure 12:
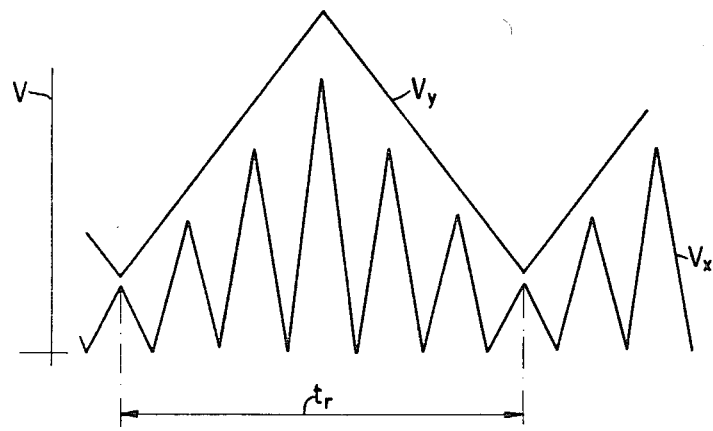
Figure 13:
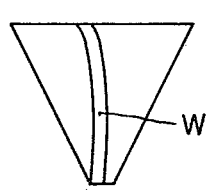

For a true display of the scanned sector the modulation of the modulator $M_1$ (FIG. 10) has to be modified so that with an increasing distance the horizontal deflection increases instead of decreases. For this purpose the amplitude of the signal of the angle scanning generator has to be increased by the amplitude of the negative signal of the range generator. The resultant signals are shown in FIG. 12 for triangularly modulated signals; for the sake of clarity the ratio between the periodicities is chosen to be 1:6. The resultant picture is shown in FIG. 13. This picture may furthermore be transformed into that of FIG. 14 by using the amplitude shown in FIG. 15c for the vertical deflection unit of the cathode-ray tube. For this purpose the arrangement of FIG. 10 is modified into that shown in FIG. 16.

Figure 14:
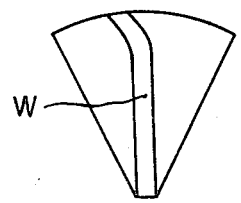
Figure 15:
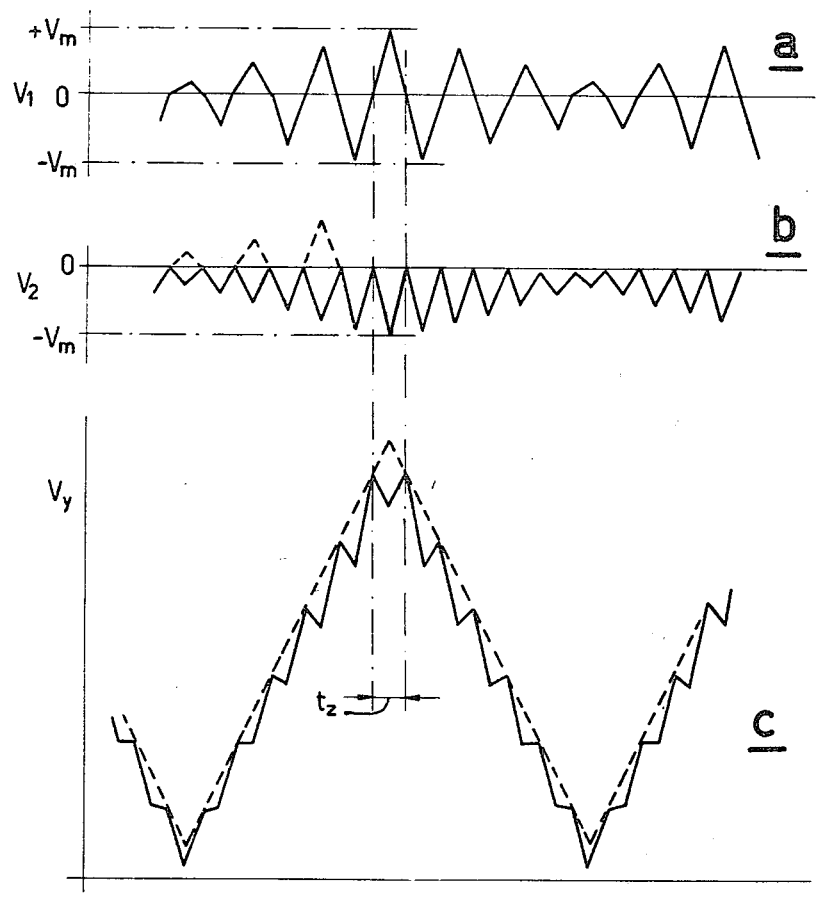
Figure 16:
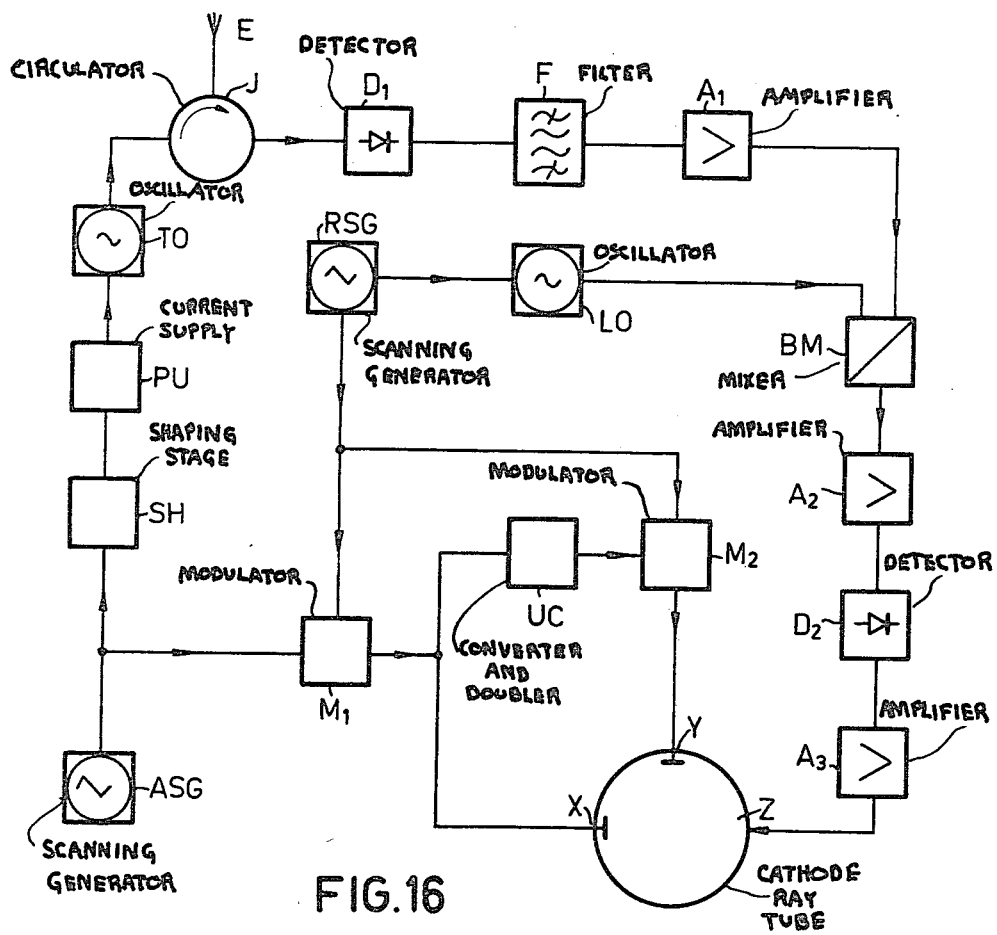

The signal from the modulator $M_1$ of FIG. 16, having the waveform of the voltage V of FIG. 12, is applied to the stage UC, where the signal is first converted into an alternating-voltage signal as shown in FIG. 15a having limits of $-V_m$ and $+V_m$ volt. This signal is then fullwave-rectified so that the frequency is doubled. This is illustrated in FIG. 15b, where the three dotted areas indicate the original signal. Subseqent to rectification the maximum are 0 and $-V_m$ volts. This signal is then added to the signal $V_y$ of FIG. 12 so that the waveform of FIG. 15c is obtained. The analysis of this waveform shows that at the instants $tz$, when the beam is at the centre of the screen by the horizontal deflection, the voltage in the vertical direction exceeds that at the preceding instant and at the next-following instant at which the horizontal deflection reaches its extreme values. This is the very form required for obtaining a sector picture of circular upper side as shown in FIG. 14.

What is claimed is:

1. A radar system whose transmitter transmits continuously a signal linearly and periodically frequency-modulated under the control of a first sawtooth generator, whilst the incoming echo signal is mixed with the transmitted signal for obtaining a beat frequency, the receiver comprising a filter for separating out predetermined beat frequency, characterized in that the system comprises an aerial having a frequency-dependent directional characteristic thereby to produce variations in the directivity as a function of the frequency of said modulated signal, and means shifting periodically the pass frequency of the filter linearly with time under the control of a second sawtooth generator, whilst the variation per unit time of the pass frequency of the filter is considerably smaller than that of the transmitted signal and the duration of the period of the second sawtooth generator is considerably longer than that of the first sawtooth generator.

2. A radar system as claimed in claim 1, characterized in that the beat-frequency signal is applied to a mixing stage in which it is mixed with the output voltage of a periodically frequency-modulated auxiliary oscillator, after which the signal is applied to the filter having a fixed pass frequency.

3. A radar system as claimed in claim 1 comprising a cathode-ray tube, characterized in that the beam intensity is modulated by the signal from the filter and the beam is deflected in a direction corresponding to the strength of the signal from the first sawtooth generator and in a direction at right angles to the first-mentioned direction in accordance with the strength of the signal of the second sawtooth generator.

4. A radar system as claimed in claim 1 comprising a cathode-ray tube, characterized in that the beam intensity is modulated by the signal from the filter and the beam is deflected in a direction corresponding to the strength of the signal of the second sawtooth generator and in a direction at right angles thereto in accordance with the strength of the amplitude-modulated signal of the first sawtooth generator with the signal of the second sawtooth generator.

5. A radar system as claimed in claim 1 comprising a cathode-ray tube, characterized in that the beam intensity is modulated by the signal from the filter and the beam is deflected in a direction in accordance with the strength of the signal of the first sawtooth generator modulated in amplitude by the signal of the second sawtooth generator and in a direction at right angles thereto in accordance with the strength of the signal of the second sawtooth generator modulated in amplitude by the fullwave-rectified A.C. component of the signal of the first sawtooth generator.

6. A radar system comprising a source of first frequency modulated oscillations that have a frequency varying substantially linearly with time with a first periodicity, an antenna having a frequency dependent directional characteristic, means applying said first oscillations to said antenna whereby a transmitted beam periodically scans a given spatial sector, and a receiver comprising a source of second frequency modulated oscillations that have a frequency varying substantially linearly with time at a second periodicity, the period of said second oscillations being substantially greater than the period of said first oscillations, means for receiving echo signals, and means for mixing received echo signals with said second oscillations to produce an intermediate frequency signal of substantially constant frequency.

7. The radar system of claim 6 wherein said means for receiving echo signals comprises means for mixing said first oscillations with echo signals.

8. The radar system of claim 6 comprising an indicator device, a source of first and second sawtooth signals having periods equal to the periods of said first and second oscillations respectively, means applying said first and second sawtooth signals to said indicator device for scanning said device in substantially orthogonal directions, detector means for detecting said intermediate frequency signal, and means applying said detected signals to said indicator device to control the intensity of display of said indicator device.

References Cited

UNITED STATES PATENTS

| 3,108,273 | 10/1963 | Erst | 343—14 |
| 3,235,866 | 2/1966 | Ogay. | |
| 3,355,734 | 11/1967 | Albanese | 343—17.2 X |
| 3,362,024 | 1/1968 | Badewitz | 343—14 X |

FOREIGN PATENTS

| 915,960 | 8/1950 | Great Britain. |

RICHARD A. FARLEY, Primary Examiner

JEFFREY P. MORRIS, Assistant Examiner

U.S. Cl. X.R.

343—17.2